T. WEAVER.
NUT-LOCK.
No. 183,089. Patented Oct. 10, 1876.
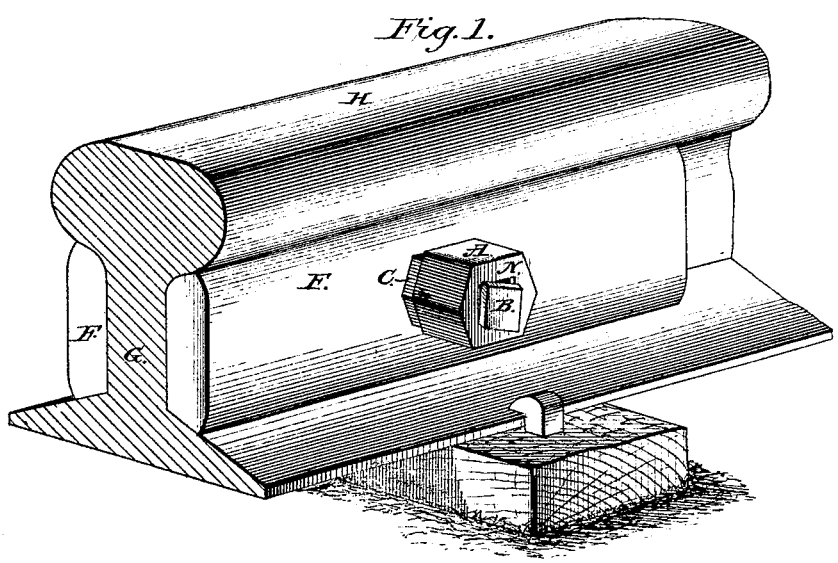
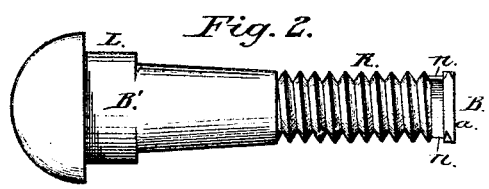
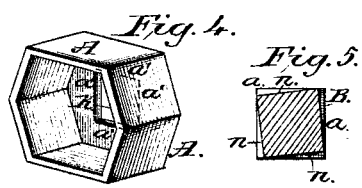
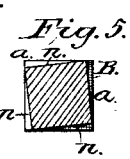
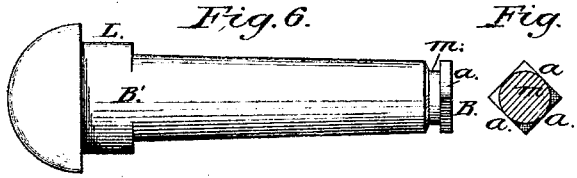
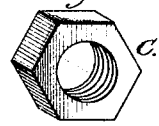
Attest:
Joseph S. Huber
Peter Stucker
Inventor:
Theophilus Weaver

UNITED STATES PATENT OFFICE.

THEOPHILUS WEAVER, OF HARRISBURG, PENNSYLVANIA.

IMPROVEMENT IN NUT-LOCKS.

Specification forming part of Letters Patent No. 183,089, dated October 10, 1876; application filed February 29, 1876.

*To all whom it may concern:*

Be it known that I, THEOPHILUS WEAVER, of the city of Harrisburg, county of Dauphin, and State of Pennsylvania, have invented certain Improvements in Nut-Locks and Bolts, of which the following is a full, clear, and accurate description, reference being had to the accompanying drawings, making a part of this specification, in which—

Figure 1 represents my device applied to a section of railway-rail. Fig. 2 represents my new bolt. Figs. 5 and 7 are end views of my bolt. Fig. 3 represents the common nut. Fig. 4 represents my nut-lock proper, or nut-check.

My invention comprises two principal parts, viz: First, a screw bolt or shaft provided with an angular button on a round or angular stem on the forward end thereof, as the means by which the nut-lock proper is attached to the bolt, and held in position as a stop or lock for the nut; second, a nut-lock proper, made with angular eye, by which it is connected as a swivel on the button and stem on the bolt, and having a skirting or series of lugs, by which the nut and swivel have a positive common motion or connection, and having also, adjacent to the sides of the angular eye therein, certain lugs, which serve as stops for the plate against the corners of the angular button on the bolt, as means to limit the throw of the swivel or lock proper.

The nature of my invention is such that it is generally applicable in situations where the end of the bolt may be allowed to project through the nut to the extent of about one-half the thickness of the nut. It is therefore applicable to railroad-rails, cars, carriages, bridges, harvesters, and machinery and structures generally where the nuts are liable to be lost or become loose by the rumble of travel or motion. It is also applicable on the ends of axles and journals as a safety device where nuts cannot be driven tightly, and in many situations where jam-nuts are now employed.

Certain old devices are shown in the drawings, such as the rail-section G H, the fish-bars F F, and the nut C. The new devices are the bolt B' B (shown in Fig. 2,) and the nut-lock proper, which is the swivel cap or plate A N. (Shown in Fig. 4.) These two parts I proceed to describe more exactly.

My improved bolt is provided with the angular button B, having the sides *a a a a*, as shown, which is mounted on a stem or grooved part of the bolt at the end of the threaded part R, and the said stem is either round, as shown at *m m*, which is the preferable form, or it is angular, as shown at *n n*, having the sides of the neck inclined to the direction of the sides *a a a a* of the angular button. The round neck or stem *m m* is preferred, because the draft or blank bolt can be then entirely dressed by a lathe. Figs. 6 and 7 represent such draft. The object of the button B, when either form of stem is employed, is to afford a means to connect thereto the nut-lock proper by a species of removable swivel-joint, as will be more fully described hereinafter. The nut-lock device A N is simply a check-piece made in cap or open box form, by which the nut is inclosed, and made to have a common motion with the check-piece, which, by the angular eye K in plate N thereof, is first passed over the button B of the bolt, to allow said button to come fully through said plate, and then it and the inclosed nut are partially rotated, thus bringing the said plate under or behind the corners of the head B as a swivel to retain the check-piece on the bolt. The rotation of said check-piece A N is stopped or limited in one of two equivalent modes, or by converse of means—that is, either by having the stops on the bolt or on the check-piece itself. The first mode is shown in Figs. 1, 2, 4, and 5, where the sides *n n* of the stem next button B are made to stop the check by impinging against the sides *a' a' a' a'* of the angular eye K therein. The second and preferable mode is shown in Fig. 6, where the round neck *m m* is not available as a stop, but the angular button B is made to set by its corners against the projections *l l l l* on the base N, in form and position as shown. The latter mode is a right and left swivel, and is therefore universal.

The operations of my nut-lock are these: First apply the nut C to the bolt by a wrench as firmly as desired. Next apply the check-piece A N to embrace the nut and the bolt as described. Next release the nut by about one-twentieth of a revolution, thus carrying the check-piece as a swivel into the locked position shown in Fig. 1. As the tendency of any disturbance is to run the nut only backward, the nut-lock is positive and reliable, and as the nut is released a fraction in the act of locking, it is not a dead-lock, and concussion of the parts in use is in favor of keeping the screw rust free in regard to sticking. The cap form of the lock proper is also in favor of excluding moisture from the nut and screw, as it shields the outer end, which is the only end exposed.

My improved bolt can be made with little or no extra cost of ordinary bolts, as the button B and neck $m$ or $n$ can be forged in the same operation as that required to make the bolt, and my improved nut-lock proper can be made a light casting, not weighing over an ounce for track-bolt use on railroads. The special advantages of my nut-lock are, therefore, simplicity, durability, cheapness, reliability, compactness, independence, and elegance.

Having thus clearly and fully described my improvements, what I regard as new, and useful, and patentable, and as my invention, I incorporate in the following claims:

1. A screw-threaded bolt or shaft, B' R, having formed on its end the angular button B and the angular stem $n$, or the round stem $m$, for the purpose of holding in locked position thereon a nut-check, A N, substantially as set forth.

2. The nut check or lock constructed with eye K to fit the button B of the bolt, and with part A to embrace the sides of the nut C, and applied thereto and to the bolt B B' as a limited and locking swivel, substantially as and for the purpose set forth.

3. The projections $l\,l\,l\,l$ on the base N of the nut-check A N, in combination with the button B on bolt B B', and with the nut C, for the purpose set forth.

In testimony that I claim the foregoing as my invention I have hereunto set my hand this 29th day of February, 1876.

THEOPHILUS WEAVER.

Attest:
 JOSEPH S. HUBER,
 PETER STUCKER.